3 Sheets—Sheet 1.
J. P. TIRRELL.
ELECTROMAGNETIC ENGINE.
No. 4,632. Reissued Nov. 7, 1871.
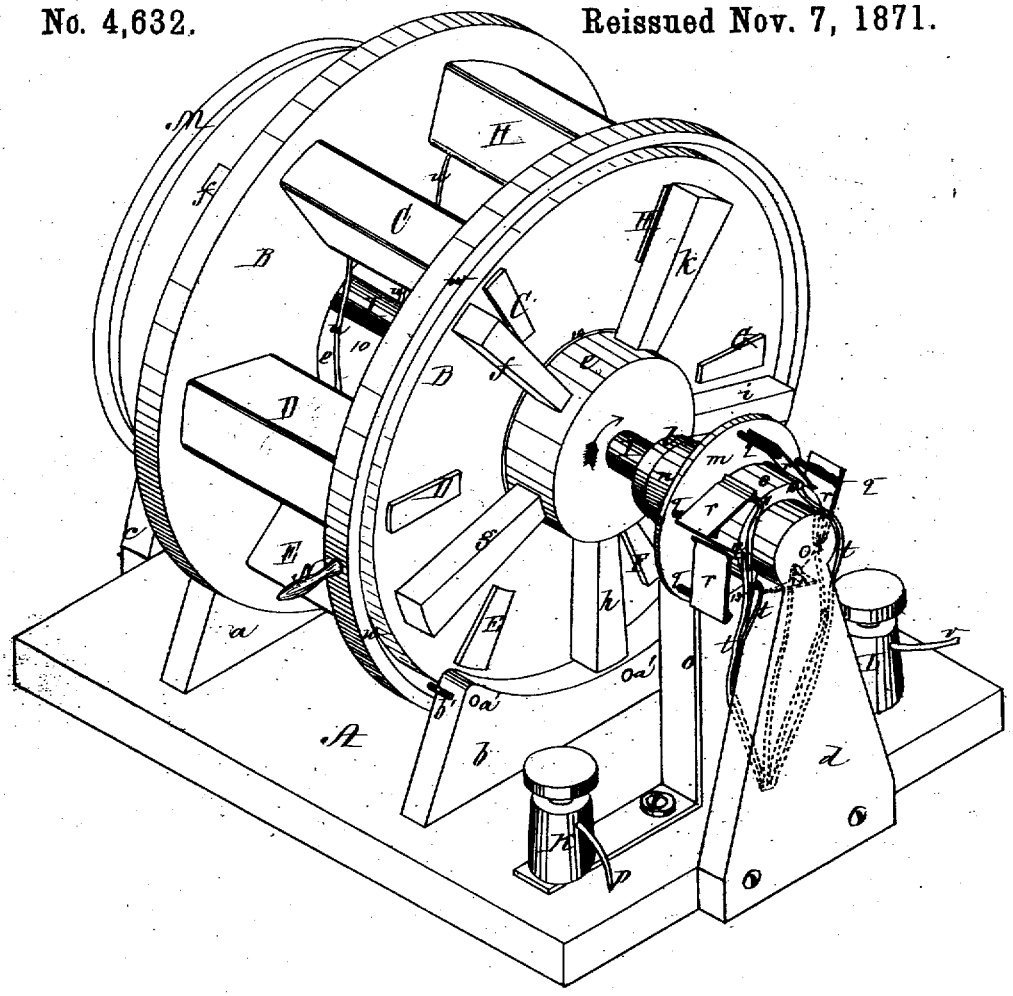
Witnesses,
P. E. Teschemacher
H. N. Stearns
Inventor,
Jacob P. Tirrell

J. P. TIRRELL.
ELECTROMAGNETIC ENGINE.
No. 4,632. Reissued Nov. 7, 1871.
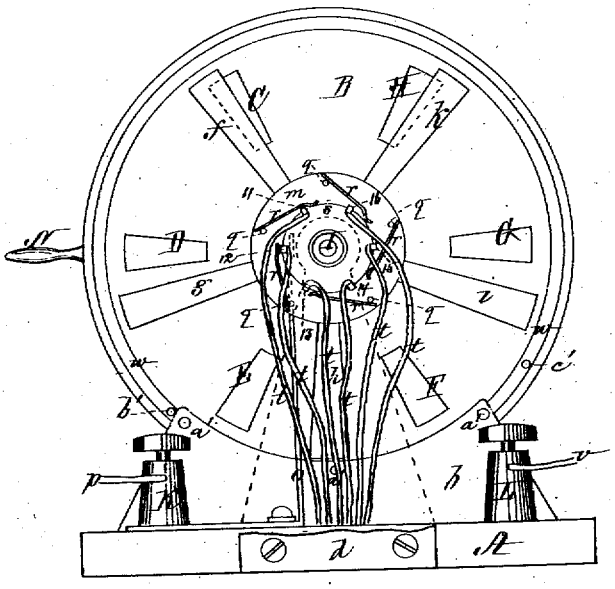
Fig. 3.
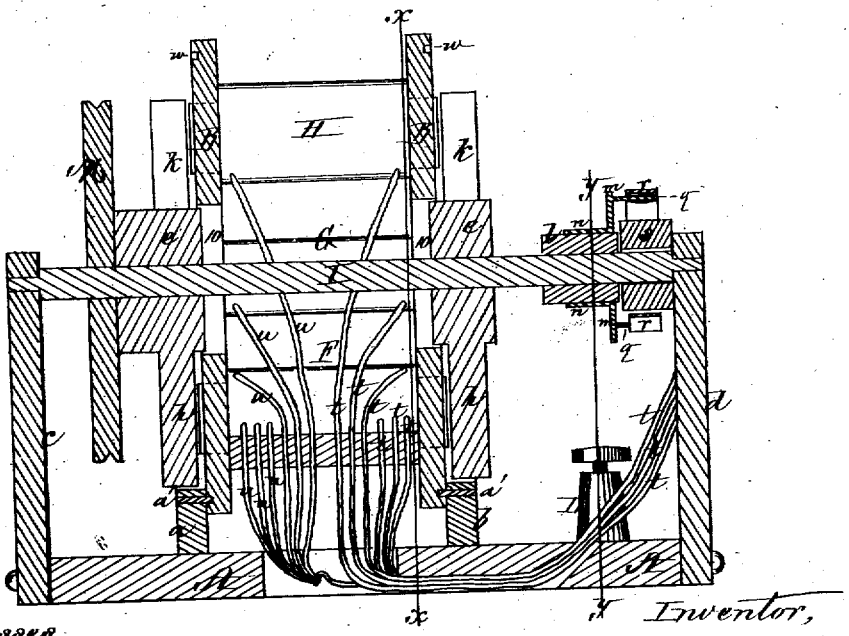
Witnesses,
P. C. Tschemacher
N. W. Stearns
Inventor,
Jacob P. Tirrell 3 Sheets—Sheet 3.

J. P. TIRRELL.

ELECTROMAGNETIC ENGINE.

No. 4,632. Reissued Nov. 7, 1871.

Witnesses,
P. C. Dieckmann
N. W. Stearns

Inventor,
Jacob P. Tirrell

UNITED STATES PATENT OFFICE.

JACOB P. TIRRELL, OF CHARLESTOWN, ASSIGNOR TO EDWARD GASSETT, OF BOSTON, MASSACHUSETTS.

IMPROVEMENT IN ELECTRO-MAGNETIC ENGINES.

Specification forming part of Letters Patent No. 118,561, dated August 29, 1871; reissue No. 4,632, dated November 7, 1871.

*To all whom it may concern:*

Be it known that I, JACOB P. TIRRELL, of Charlestown, in the county of Middlesex and State of Massachusets, have invented an Improved Electro-Magnetic Engine, of which the following is a full, clear, and exact description, reference being had to the accompanying drawing making part of this specification, in which—

Figure 4:
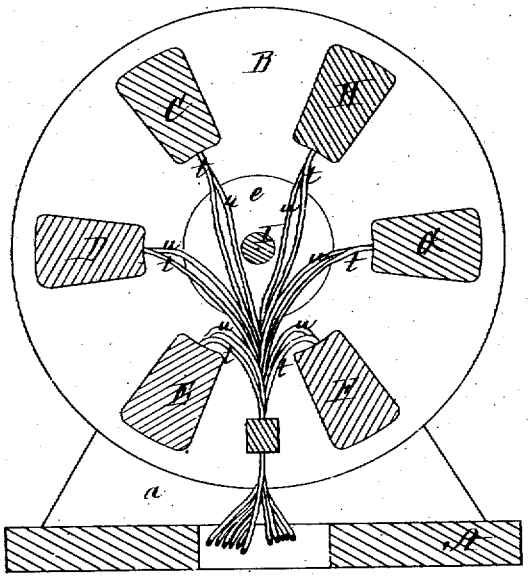
Figure 5:
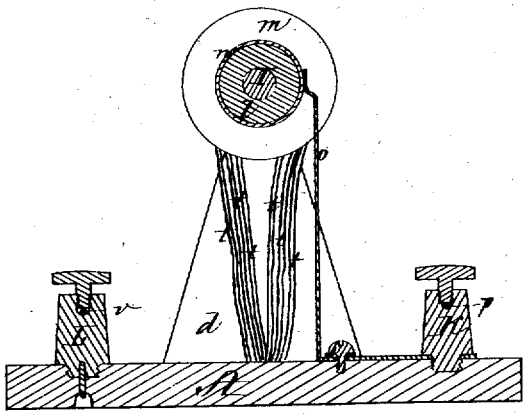

Figure 1 is a perspective view of my improved electro-magnetic engine. Fig. 2 is an end elevation of the same, one of the supports being broken away to show the parts behind it. Fig. 3 is a longitudinal vertical section through the center of the same. Fig. 4 is a transverse vertical section on the line *x x* of Fig. 3. Fig. 5 is a section on the line *y y* of Fig. 3.

My invention consists in a series of electro-magnets arranged radially in a frame, in combination with a series of radial arms placed on one or both sides of the same, and connected with a shaft which operates a circuit-breaker or device for successively making and breaking the electric circuit through the several electro-magnets as the shaft revolves, by which construction I am enabled to produce a simple, compact, and effective electro-magnetic engine; and my invention also consists in making the frame which supports the electro-magnets adjustable around the central shaft, whereby the relative position of the electro-magnets with respect to the radial arms when the electric circuit is broken may be varied so that the electro-magnets will attract the arms with more or less force, thus increasing or diminishing the speed of the engine, as desired.

To enable others skilled in the art to understand and use my invention, I will proceed to describe the manner in which I have carried it out.

In the said drawing, A represents the base of the engine, from which rise two cheeks, *a b*, which support a circular frame, B, composed of two disks, between which is secured a series of six electro-magnets, C D E F G H, which are arranged radially, the ends or poles of each electro-magnet projecting through the disks, as seen in Figs. 1 and 2. I is a horizontal shaft which passes through openings 10 at the center of the frame B, and runs in suitable bearings or supports *c d*. To this shaft I, on each side of the frame B, is secured a hub, *e*, from which projects a series of radial arms, *f g h i k*, which revolve in close proximity to the poles of the electro-magnets. Connected with the shaft I and revolving therewith is a circuit-breaker or device, by means of which each electro-magnet is brought into action in succession by making and breaking contact with the battery as the shaft revolves.

The construction and operation of the circuit-breaker will now be described. *l* is an insulating-sleeve attached to the shaft I and revolving therewith, and to this sleeve *l* is secured a metallic disk, *m*, provided with a flange or collar, *n*, upon which bears a flat spring, *o*, connected with the binding-screw K, to which the wire *p* from one pole of the battery is attached. From the disk *m* projects a series of five pins, *q*, to each of which is secured a flat spring, *r*, and these springs as they revolve with the shaft bear upon a stationary cylindrical block, *s*, of insulating material, through which the shaft I passes. 11 12 13 14 15 16 are metallic bars or strips which are partially embedded in the insulating-block *s*, and project above its surface. The number of these bars corresponds to the number of electro-magnets, and each electro-magnet is connected with one of the bars by a wire, *t*, so that, as the shaft I is revolved, the electric current passes by the springs *o* to the disk *m*, and thence by the springs *r*, bars 11 12 13 14 15 16, and wires *t*, successively, to the several electro-magnets, the electric current leaving each electro-magnet by a separate wire, *u*, which is connected with the binding-screw L, to which is attached the wire *v*, by which the current passes to the opposite pole of the battery.

The operation of the engine is as follows: The parts being in the position seen in Fig. 1, the current passes from the binding-screw K to the spring *o* and disk *m*, thence by one of the springs *r* to the bar 11, and by the wire *t*, connected therewith, to the electro-magnet C, after passing through which it is conducted by the wire *u* connected therewith to the binding-screw L and back to the battery. The circuit being thus completed, the electro-magnet C is brought into action and attracts the arm *f*, which is drawn toward it (at the same time turning the shaft I) until it is brought into the position seen in Fig. 2, at which point the magnet exerts its greatest force upon the arm, when the spring *r* passes out of contact with the bar 11, thus breaking the circuit through the electro-magnet C, which then ceases to act. Just previous to the breaking of the circuit through the electro-magnet C the next spring *r* comes into contact with the bar 12, which causes the current to pass through the electro-magnet D, which then attracts the next arm *g*, (which is at that time in a proper position,) until this spring *r* passes out of contact with the bar 12, when the electro-magnet D ceases to act, and so on continuously, the electro-magnets being rapidly brought into action in succession, and as the attracting power is applied to some one of the radial arms at all times, a steady pull or draft is maintained for the purpose of revolving the shaft I in the direction of the arrow, Fig. 1.

It will be seen that the number of radial arms on each side of the frame B is one less than the number of electro-magnets, and that all of the electro-magnets are brought into action in succession while a single arm is traversing the distance between the poles of two adjacent electro-magnets, by which arrangement one or other of the arms of a series is at all times in a position to be attracted by some one of the electro-magnets, and this, in connection with the passing of the current through each electro-magnet just before the circuit through the previous one is broken, insures the starting of the engine without regard to the position of the arms. The number of the arms and electro-magnets and the relative proportion between them may, however, be varied at pleasure without departing from the spirit of my invention.

Attached to the shaft I is a pulley, M, from which the power of the engine may be communicated to the machine to be driven by a belt, not shown. The frame B is provided on each side near its periphery with a groove, *w*, and into these grooves fits a series of pins, *a'*, projecting from the inner sides of the cheeks *a b*, by which arrangement the frame B is supported in place, while it is free to be moved around the shaft I as a center by means of the handle N, its motion in either direction being limited by stop-pins *b' c'*. By thus making the frame B adjustable around the central shaft I the relative position of the electro-magnets with respect to the radial arms when the electric circuit is broken may be varied so that the electro-magnets will attract the arms with more or less force, thus increasing or diminishing the speed of the engine, as desired. This variation of speed is of vast importance in many cases, as, for instance, when the engine is employed for driving a sewing-machine; and in the latter case the frame B may be adjusted by a series of levers connected therewith and operated by an arm placed in a convenient position on the table. By varying the position of the stop-pin *b' c'* so as to allow of an increased movement of the frame B the direction of motion of the shaft I may be reversed. If preferred, the parts may be so arranged that two adjacent electro-magnets may be brought into action simultaneously, instead of one, as above described.

It is evident that instead of bar electro-magnets those of horseshoe-form may be employed, with both poles projecting through one side of the frame B, in which case a series of radial arms on one side only of the frame would be required; but I prefer the construction and arrangement first described.

The above-described electro-magnetic engine is effective, simple, and not liable to get out of order, while it is exceedingly compact, and may be furnished at a moderate cost.

What I claim as my invention, and desire to secure by Letters Patent, is—

1. A series of electro-magnets arranged radially in a frame, B, in combination with a series of radial arms placed on one or both sides of the same, and connected with a shaft, I, which operates a circuit-breaker, substantially as and for the purpose set forth.

2. The frame B with its electro-magnets, made adjustable, substantially as and for the purpose set forth.

Witness my hand this 17th day of October, A. D. 1871.

JACOB P. TIRRELL.

Witnesses:

FRANKLIN N. POOR,
W. J. CAMBRIDGE.

(50)